March 3, 1936.  C. T. KAMMEYER  2,032,939
DEVICE FOR OPENING EGGS
Filed Nov. 27, 1934
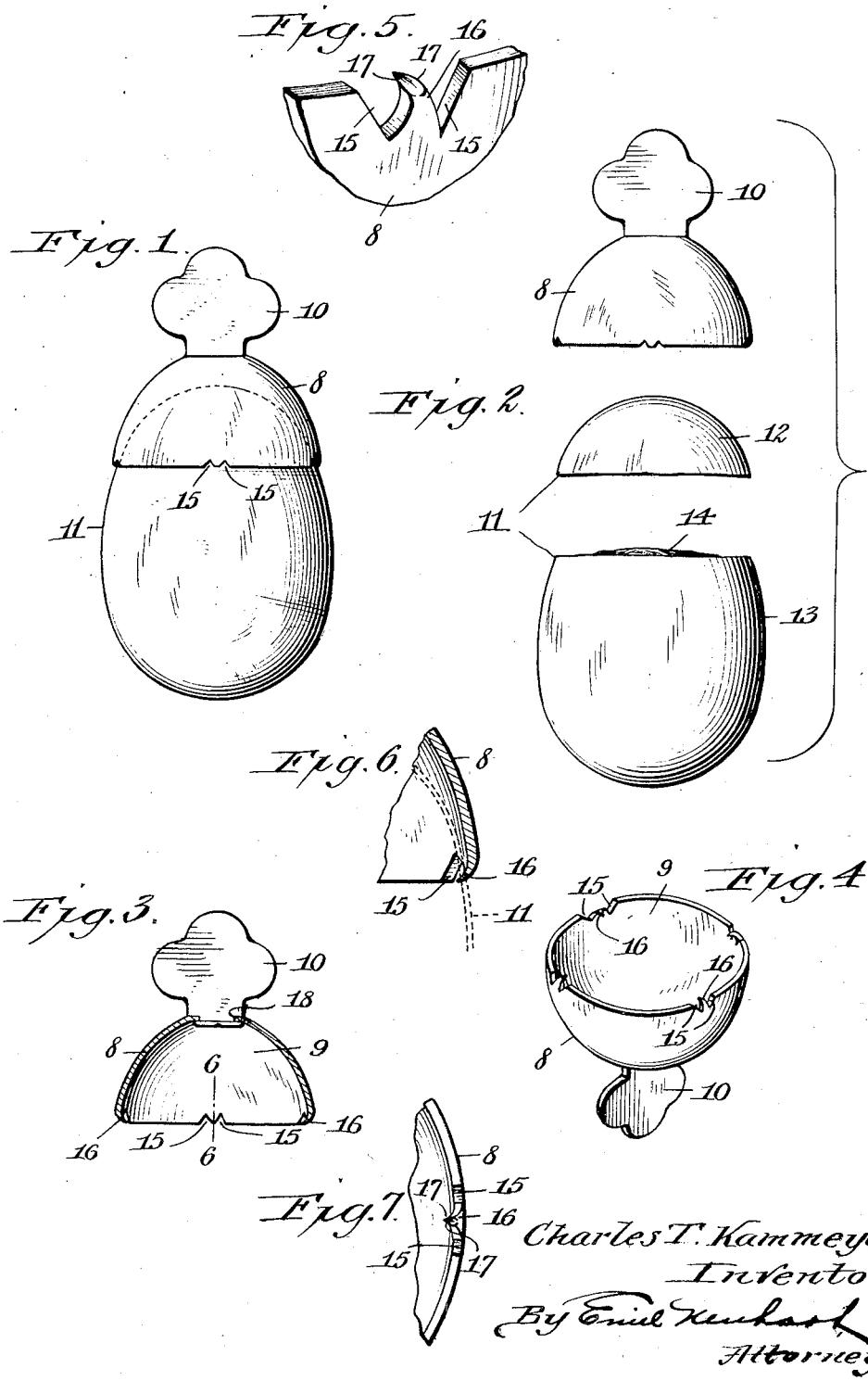

Patented Mar. 3, 1936

2,032,939

UNITED STATES PATENT OFFICE 2,032,939

DEVICE FOR OPENING EGGS

Charles T. Kammeyer, Niagara Falls, N. Y.

Application November 27, 1934, Serial No. 754,985

2 Claims. (Cl. 146—2)

My invention relates to an improved egg-opening device.

Opening eggs, especially raw eggs, appears to be a difficult task with many, and under most favorable conditions is quite mussy, in that the contents of the eggs become spattered and the eggshells broken and mixed with the contents.

Various egg opening devices have been designed, but invariably pressure has been resorted to, which causes the shell of the egg to crack irregularly and become collapsed, and when opening a boiled egg, and especially a medium boiled egg, small particles of the shell are caused to be embedded in the boiled egg-content.

It is the object of my invention to provide a simple and inexpensive device for opening eggs, which is equally effective on raw and boiled eggs, but is particularly designed for opening raw eggs.

A further object of my invention is to provide a device of this character, which will separate the shell of the egg into two unequal parts by a line substantially straight-edged circumferentially around the shell so that a portion of the shell can be removed and the contents retained in the remainder of the eggshell.

A further object of my invention is to provide a device of this kind which can be conveniently stamped out of sheet metal and be provided with a series of pointed shell-penetrating cutting prongs, and which may or may not be provided with a suitable handle for rotating the device while holding the egg in position.

A still further object of my invention is to provide a bowl-like device adapted to receive a portion of an egg, and which is provided with means for penetrating the shell of the egg during the act of placing the device into cutting position thereon, the device being preferably also provided with a suitable handle to conveniently rotate it after penetrating the shell of the egg, said shell-penetrating means being at the edge of the bowl-like device and adapted to cut the eggshell circumferentially, while the said edge, which is comparatively sharp at the angles or corners, as shown in Figs. 4 and 5, prevents movement of the egg within the bowl-like device and thus assures a line of severance which is clean cut.

With the above and other objects in view to appear hereinafter, my invention consists in the novel features of construction and in the arrangement and combination of parts to be hereinafter described and particularly pointed out in the subjoined claims.

In the drawing:

Fig. 1 is a side elevation of the device showing the manner in which it is placed over an egg preparatory to severing the same.

Fig. 2 is a side elevation of the same associated with an egg in which a small end portion is shown severed from the major portion with the major portion retaining the contents of the egg.

Fig. 3 is a longitudinal section through the device.

Fig. 4 is an inverted perspective view of the device.

Fig. 5 is an enlarged perspective view of a portion of the edge or rim of the device, showing one of the angular shell-penetrating prongs and the sharp lateral cutting edges thereof.

Fig. 6 is an enlarged section taken on line 6—6, Fig. 3.

Fig. 7 is an enlarged edge view of a portion of the wall of the device.

The reference numeral 8 designates the body portion of the cutter, which is bowl-shaped and of substantially concavo-convex formation in section so as to provide a hollow interior, or egg-receiving space 9 into which a portion, preferably the small end of an egg, may be inserted.

The device is preferably constructed of sheet metal, case hardened, and it is axially equipped at its rear end with a handle 10 by means of which it may be rotated when positioned over one end of an egg, as clearly shown in Fig. 1, wherein the numeral 11 designates the egg. As will be apparent, upon examination of Figs. 4 and 5, the angles or corners formed by the edge and the inner and outer surfaces of the bowl-like device are comparatively sharp, which has decided advantages, as will appear hereinafter.

In Figure 2 the egg is also designated by the numeral 11, but the small upper end is in the form of a sector 12 severed from the major portion 13 having the contents of the egg 14 shown therein; this severed egg being associated in disassembled manner from the egg so that the exact line of severance between the two portions of the egg are clearly illustrated and the small sector 12 shown removed from the bowl-like egg cutting device.

As clearly shown in Figure 1, the egg does not occupy the entire hollow interior or egg-receiving space 9 of the device. Consequently, when placing the device over an egg, the edge or rim of the circumferential wall of the device, more particularly the sharp inner corner or angle of said edge, is brought in contact with the shell at all points thereof. It is to be noted, however, that the edge of the body portion is cut-away, as at 15, to provide spaced-apart notches, and the sheet-metal material between these notches is consequently pointed and directed inwardly at less than a right angle, as at 16, to form shell-penetrating prongs which will penetrate the shell of the egg when placing the device over one end of the egg and exerting pressure downwardly thereon, the inward deflection of said prongs being sufficient only to pass through the shell of the egg and, as clearly shown in Figure 5, they are provided with lateral cutting edges 17 so that upon rotation of the device with one hand, while holding the egg in the other after causing said prongs to penetrate the shell of the egg, the shell will be cut circumferentially to sever it and form a minor severed portion, such as the sector 12, and a major portion 13 containing the contents of the egg. The prongs 16 may therefore be said to be directed inwardly and forwardly from the circumferential wall of the body portion, and for most effective results, the points thereof are in the plane of the edge of the bowl-like body portion of the device. Severing the egg into two parts is accomplished by holding the egg gently but non-rotatively in one hand and rotating the bowl-like device by means of the handle 10. Due to the fact that the sharp inner corner or angle of the said edge rides in contact with the shell of the egg, the egg cannot easily be moved within the device and therefore a straight line of severance is assured, in contradistinction to the action of other devices which allows displacement or wobbling movement of the egg which results in forming several irregular track lines on the shell, requiring considerable manipulation before a fixed track line is established capable of causing severance of the egg shell. When more than a single track line is formed around the egg, a ragged line of severance may be created with particles of the shell forced into the egg content. A straight line of severance is assured due to the points of the prongs being in the plane of the edge of the bowl-like device, under which arrangement the points are compelled to follow the track line established by the sharp inner angle or corner formed on the edge of the bowl-like body portion of the device.

In the event that the contents of the egg occupies more than the average space within the shell, the egg can be removed while retaining the two severed portions in contact, and both portions may be separated at the point of use of the egg so as to avoid the contents overflowing the major portion and being wasted.

I preferably form the notches 15 of V-shape and in close relation so that the metal between the same is of V-shape reversed from the notches, thus forming the nib or point on the prongs by the act of forming the notches, and the pointed extremities of these prongs are beveled laterally from their points inwardly for a portion of their lengths to form the sharp cutting edges 17.

While I do not wish to limit myself to the number of prongs provided around the edge of the bowl-like body portion, I preferably provide four, spaced equi-distantly around the circumference of this body portion. By directing the pointed ends of the prongs inwardly and forwardly, or at an angle less than a right angle, contact of the edge of the body portion of the device with the shell will assure the egg being penetrated at four points in the circumference of the same, a considerable distance from the longitudinal center of the egg, so that a comparatively small portion of the egg only will be severed. This assures, in most instances, that the entire contents of the egg will be retained in the major portion of the shell, since upon rotating the device with one hand while holding the egg in the other through a little more than a quarter revolution, a complete line of separation will be established between two parts of the eggshell.

The handle may be formed on the bowl-like body portion in any approved manner, or said body portion may be devoid of a handle, but I have found that a flat handle stamped out of sheet metal will give the user a firm grip so that he need not grasp the egg in such a firm manner as to cause it to collapse, since it is only necessary to hold the egg steady after positioning the device over one end thereof and penetrating the shell of the egg with the pointed and sharpened prongs, after which the flat handle enables the device to be easily rotated with the prongs or teats moving circumferentially through the shell.

For the purpose of fastening the handle to the bowl-like body portion of the device, an opening 18 is formed in the rear closed end of the body portion and is upset in any desired manner interiorly so as to firmly fasten the handle to the body portion.

Having thus described my invention, what I claim is:

1. An egg-opening device, comprising a bowl-like body portion approximating the shape of an egg at one end thereof and having an even edge whose inner corner formed by the face of said edge and the inner surface of said bowl-like body portion is comparatively sharp and adapted to lie in direct contact with the shell of the egg to form a track line on said shell and to prevent wobbling movement of the egg within said body portion, said body portion being provided circumferentially at said edge with a series of inwardly-directed pointed prongs, the prongs of which are in the plane of said sharp corner, said prongs extending inwardly a distance approximating the thickness of an egg shell and serving to sever the said shell circumferentially into two parts.

2. An egg-opening device, comprising a bowl-like body portion approximating the shape of an egg at one end thereof and having an even edge whose inner corner formed by the face of said edge and the inner surface of said bowl-like body portion is comparatively sharp and adapted to lie in direct contact with the shell of the egg to form a track line on said shell and to prevent wobbling movement of the egg within said body portion, said body portion being provided at said edge with an inwardly-directly pointed prong which is in the plane of said sharp corner, said prong extending inwardly from said edge to sever the said shell circumferentially into two parts.

CHARLES T. KAMMEYER.